April 19, 1927.   1,625,111

E. WEINAUG ET AL

UNIVERSAL ELECTRIC TESTING INSTRUMENT

Filed March 14, 1922

Inventors
Emile Weinaug
Reginald L. Macfarlane
By
Dewey Strong
Townsend and Loftus.
Attorneys Patented Apr. 19, 1927.

1,625,111

UNITED STATES PATENT OFFICE.

EMILE WEINAUG AND REGINALD L. MACFARLANE, OF SAN FRANCISCO, CALIFORNIA, ASSIGNORS, BY DIRECT AND MESNE ASSIGNMENTS, OF ONE-HALF TO JOSEPH SILVEN AND ONE-HALF TO WALTER E. WAECHTLER, BOTH OF SAN FRANCISCO, CALIFORNIA.

UNIVERSAL ELECTRIC TESTING INSTRUMENT.

Application filed March 14, 1922. Serial No. 543,687.

This invention relates to electric testing instruments, and especially to such instruments as are employed for determining electric voltage, amperage, magnetic strength, etc.; the object of the present invention being to improve and simplify instruments of this character and especially to combine in a single instrument a simple, compact mechanism whereby the voltage and amperage in a battery or an electric circuit may be readily and accurately determined; the strength of the magnet quickly tested and foul plugs or short circuits and the like in the high tension circuit of an internal combustion engine ignition system located.

Further objects will hereinafter appear.

The invention consists of the parts and the construction, combination and arrangement of parts as hereinafter more fully described and claimed, having reference to the accompanying drawings, in which—

Figure 1:
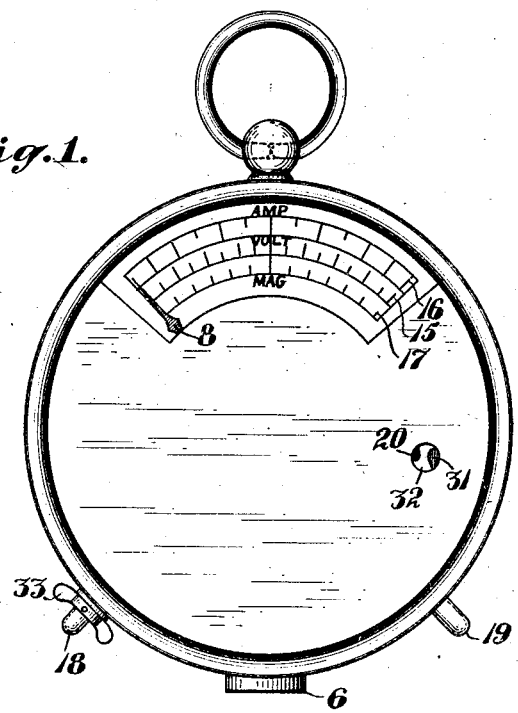
Fig. 1 is a front view of the testing instrument.
Figure 2:
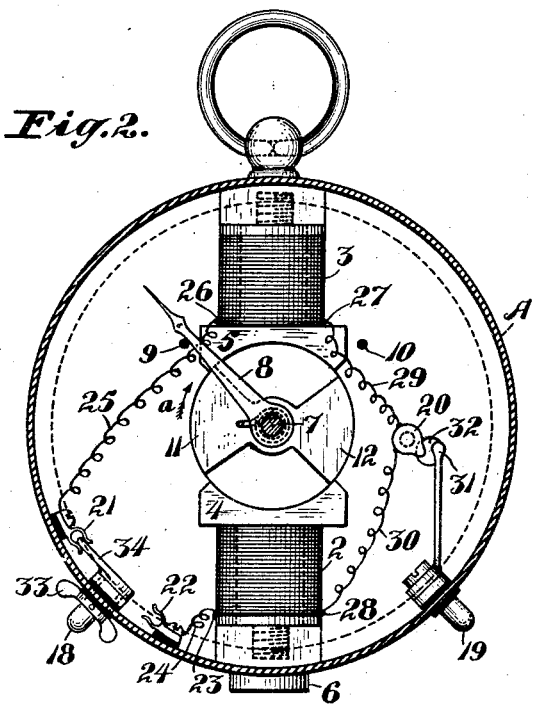
Fig. 2 is a sectional view of the same showing the interior mechanism employed.
Figure 3:
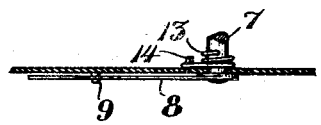
Fig. 3 is a detail view of the armature spindle and the pointer or hand actuated thereby.

Referring to the drawings in detail, and particularly to Fig. 2, A indicates a casing constructed of brass or other suitable material. The casing is preferably circular in formation and designed to give the appearance of a pocket watch or the like. It is in actual practice designed so compact and small that it may be readily carried about as a watch. Suitably secured within the casing is a pair of magnets as indicated at 2 and 3. The magnet indicated at 3 is wound with fine wire and is employed for the purpose of determining the voltage of a current, while the magnet indicated at 2 is wound with a comparatively coarse wire and is employed for the purpose of determining the amperage of an electric current. Each magnet consists of a spool of the usual construction provided for the reception of the wire winding, and each magnet carries a core which in this instance terminates in segmental foot pieces as indicated at 4 and 5. The core of the magnet 2 is furthermore extended through the casing as indicated at 6 to form a contact member, the function of which will hereinafter be described. Suitably journalled between the front and rear sides of the casing A is an arbor 7 and secured thereto is a hand or pointer 8, the movement of which is limited by means of a pair of stop pins 9 and 10. Also secured on the arbor is an armature consisting of two segments 11 and 12, and adapted to normally maintain the pointer 8 and the segments 11 and 12 in the position shown in Fig. 2 is a surrounding coil spring 13; one end of the spring being secured to the pointer and the opposite end to a pin 14, as shown in Fig. 3. This spring is exceedingly light and its tension is just sufficient to return the armature and pointer when the instrument is not in use. The instrument is otherwise provided with an index which is graduated to present three scales, such as shown at 15, 16 and 17; the scale 15 indicating the voltage of a current, the scale 16 the amperage, and the scale 17 the magnetic strength. The method of determining these various factors will later be described.

The instrument as a whole is otherwise provided with three main terminals as indicated at 18, 19 and 20. The terminal 20 is secured within the casing and is grounded thereto. The terminal 19 is insulated from the casing as shown, but is rigidly secured thereto. The terminal 18 is similarly insulated from the casing, but it is turnably mounted to permit formation of a circuit through one or another of a pair of auxiliary contacts as indicated at 21 and 22. Both of these contacts are insulated with relation to the casing, one contact being connected with a terminal 23 of the magnet 2 by means of a wire 24, while the opposite terminal is connected by means of a wire 25 with a terminal 26 of the magnet 3. The opposite terminals 27 and 28 of the respective magnets 2 and 3 are connected by means of wires 29 and 30 with the grounded terminal 20, and the respective circuits formed therethrough will hereinafter be referred to.

The terminal 19, as previously stated, is stationary and insulated from the casing. It however carries an extended contact 31 which terminates at a point adjacent the terminal 20. A spacing however is maintained between the two as shown in Fig. 2 and an opening 32 is formed in the casing in alignment therewith to visibly display the points of the contact and the terminal 20. The terminal 18, as previously stated, is turnably mounted in the casing; its outer end being provided with a turning piece or thumb extension 33, while the inner end is provided with a contact arm 34 which may be swung into engagement with either of the auxiliary terminals 21 and 22. The operation of the instrument will be as follows:

If it is desired to determine the voltage of an electric circuit or a battery, it is only necessary to turn the terminal 18 until the contact 34 engages the auxiliary contact 21. The casing of the instrument is then grounded with relation to one terminal of a circuit to be tested and the other terminal of the circuit is connected with the contact 18. The current will then flow through the terminal 18, the contacts 21 and 34, wire 25, magnet 3, wire 29, and terminal 20, and as this is grounded the circuit will be completed and magnet 3 will be energized. Such energization will affect the armature or the segments 11 and 12, and these will turn against the tension of the spring 13 in the direction of arrow a; the distance turned depending entirely upon the voltage exerted which will thus be indicated by the pointer 8 on the voltage scale 15. The voltage in a circuit may thus be readily, quickly and accurately determined. If it is desired to determine the amperage of a circuit, it is accomplished in the same manner; the only difference being that the terminal 18 is turned to a point where the contact 34 will engage the auxiliary terminal 22. The circuit will in that instance be closed through the magnet 2 and will energize the same and thereby partially rotate the segments of the armature. The pointer 8 will again swing over the index and the amount of amperage will be recorded on scale 16. If it is desired to determine the magnetic strength of one or more magnets in the magneto, or in fact any electric appliance employing permanent magnets, it can be readily and quickly accomplished without removing the same as it will only be necessary to place the contact 6 in engagement with one of the legs of the magnet to be tested. Such engagement will energize the core of the magnet 2 and the armature will again be attracted or rotated, thus swinging the pointer over the scale 17, which thus indicates the magnetic strength. The value of this method of testing should be appreciated as it does not require contact with the opposite bolts of the magnet and thus eliminates removal of the individual magnets when a test is to be made.

If it is desired to test the high tension side of an ignition circuit, for instance on an automobile or the like, it is accomplished by forming a circuit through the terminals 19 and 20. For instance if it is desired to determine whether a spark plug is fouled or not, it is only necessary to ground the casing A and to place the terminal 19 in engagement with the central terminal of the spark plug. If the plug is dirty or fouled, no spark, or at least a poor spark, will appear between the contact 31 and the terminal 20, which may be visibly observed through the opening 32. Again if it is desired to determine whether any of the conductors are leaking, it is merely necessary to connect the respective conductors with the terminal 19 and to ground the casing, as the results produced can be observed through the opening 32.

From the foregoing it can be seen that a simple compact instrument has been provided which may be conveniently employed by garage men, automobile owners and the like, and the troubles in connection with the electrical installation of automobiles can be quickly and readily determined and this without the use of several independent instruments. The speed and efficiency of the average garage worker will thus be increased and the liability of misplacing one or more instruments is obviated. The instrument here disclosed is furthermore so small and compact, and so shaped that it may be conveniently carried in the pocket at all times, and it should for this reason be handy for immediate use whenever required.

While certain features of the present invention are more or less specifically illustrated, we wish it understood that various changes in form and proportion may be resorted to within the scope of the appended claims, similarly that the materials and finish of the several parts employed may be such as the experience and judgment of the manufacturer may dictate or various uses may demand.

Having thus described our invention, what we claim and desire to secure by Letters Patent is—

1. In an instrument of the character described, a casing, a pair of opposed magnets mounted therein, one having a fine and the other a coarse wire winding, a core in each magnet, the core of one magnet extending beyond the casing, an armature pivotally disposed between the cores of the magnets and actuated thereby, a pointer movable in unison with said armature, an index and a volt, ampere, and a magnet strength indicating scale on said index over which the pointer is movable to indicate either voltage, amperage or magnetic strength.

2. In an instrument of the character described, a casing, a pair of opposed magnets mounted therein, one having a fine and the other a coarse wire winding, a core in each magnet, the core of one magnet extending beyond the casing, an armature pivotally disposed between the cores of the magnets and actuated thereby, a pointer movable in unison with said armature, an index and a volt, ampere and a magnet strength indicating scale on said index over which the pointer is movable to indicate either voltage, amperage or magnetic strength, a pair of terminals insulated from the casing, said terminals being connected to the respective magnets, another terminal grounded with relation to the casing and also connected with the respective magnets, a terminal disposed between the first named terminals and turnable, and a switch member on said terminal engageable with either of the first named terminals to close a circuit through either magnet.

3. In an instrument of the character described a casing, a magnet mounted therein, a core in said magnet projecting through the opposite ends thereof and one end of the core projecting through the casing to form a contact, an armature pivotally disposed adjacent the opposite end of the core, a pointer movable in unison with the armature, an index having scales formed thereon over which the pointer is movable, means for energizing the core of the magnet by passing a current therethrough, and means permitting energization of the core by placing the projecting contact end thereof in engagement with a magnet.

EMILE WEINAUG.
REGINALD L. MACFARLANE.